(12) United States Patent
Kameoka et al.

(10) Patent No.: US 11,869,486 B2
(45) Date of Patent: Jan. 9, 2024

(54) VOICE CONVERSION LEARNING DEVICE, VOICE CONVERSION DEVICE, METHOD, AND PROGRAM

(71) Applicant: NIPPON TELEGRAPH AND TELEPHONE CORPORATION, Tokyo (JP)

(72) Inventors: Hirokazu Kameoka, Tokyo (JP); Takuhiro Kaneko, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 450 days.

(21) Appl. No.: 17/268,053

(22) PCT Filed: Aug. 13, 2019

(86) PCT No.: PCT/JP2019/031844
§ 371 (c)(1),
(2) Date: Feb. 11, 2021

(87) PCT Pub. No.: WO2020/036178
PCT Pub. Date: Feb. 20, 2020

(65) Prior Publication Data
US 2022/0122591 A1   Apr. 21, 2022

(30) Foreign Application Priority Data
Aug. 13, 2018   (JP) .................. 2018-152394

(51) Int. Cl.
*G10L 15/16*   (2006.01)
*G10L 15/06*   (2013.01)
*G10L 15/10*   (2006.01)
*G10L 15/22*   (2006.01)

(52) U.S. Cl.
CPC ............ *G10L 15/16* (2013.01); *G10L 15/063* (2013.01); *G10L 15/10* (2013.01); *G10L 15/22* (2013.01); *G10L 2015/0631* (2013.01); *G10L 2015/227* (2013.01)

(58) Field of Classification Search
CPC ................................ G10L 15/16; G10L 15/22
See application file for complete search history.

(56) References Cited

PUBLICATIONS

Hsu et al. (2016) "Voice conversion from non-parallel corpora using variational auto-encoder," APSIPA, pp. 1-6. (Year: 2016).*
Kaneko et al. (2017) "Parallel-data-free voice conversion using cycle-consistent adversarial networks," NTT Communication Science Laboratories, NTT Corporation, Japan, 5 pages. (Year: 2017).*
Hisu et al. (2016) "Voice conversion from non-parallel corpora using variational auto-encoder," APSIPA, pp. 1-6.
Hsu et al. (2017) "Voice conversion from unaligned corpora using variational autoencoding Wasserstein generative adversarial networks," Interspeech, pp. 3364-3368.

(Continued)

*Primary Examiner* — Ibrahim Siddo

(57) ABSTRACT

To be able to convert to a voice of the desired attribution. A learning unit learns a converter to minimize a value of a learning criterion of the converter, learns a voice identifier to minimize a value of a learning criterion of the voice identifier, and learns an attribution identifier to minimize a value of a learning criterion of the attribution identifier.

20 Claims, 12 Drawing Sheets

(56) References Cited

PUBLICATIONS

Kaneko et al. (2017) "Parallel-data-free voice conversion using cycle-consistent adversarial networks," NTT Communication Science Laboratories, NTT Corporation, Japan, 5 pages.
NTT Communication Science Laboratories (2018) "Return the atmosphere and audibility of the sound," Open House 2018, pp. 37.
Kameoka et al. (2018) "STARGAN-VC: Non-Parallel Many-to-Many Voice Conversion With Star Adversarial Networks" arXiv [online] website: https://arxiv.org/pdf/1806.02169.pdf.

* cited by examiner

VOICE CONVERSION LEARNING DEVICE, VOICE CONVERSION DEVICE, METHOD, AND PROGRAM

CROSS-REFERENCE TO RELATED APPLICATIONS

This application is a U.S. 371 Application of International Patent Application No. PCT/JP2019/031844, filed on 13 Aug. 2019, which application claims priority to and the benefit of JP Application No. 2018-152394, filed on 13 Aug. 2018, the disclosures of which are hereby incorporated herein by reference in their entireties.

TECHNICAL FIELD

The present invention relates to a voice conversion learning device, voice conversion device, method, and program, and more particularly, to a voice conversion learning device, voice conversion device, method, and program for converting a voice.

BACKGROUND ART

The voice conversion is a technology for converting only a non-language/paralanguage (such as speaker individuality and utterance style) while keeping the language information (utterance sentences) in the input voice. The voice conversion can be applied to speaker individuality conversion, speech support, speech enhancement, and pronunciation conversion or the like in text speech synthesis. The problem in the voice conversion can be formulated as a problem in regression analysis in estimating the mapping function from the sound feature value of the conversion-source voice to the sound feature value of the conversion-target voice. Among conventional voice conversion methods, a technique using the Gaussian Mixture Model (GMM) is commonly used because of its validity and versatility. Recent studies also evaluate neural network based techniques such as the Feed-Forward Neural Network (NN), the Recurrent NN (RNN), and the Convolutional NN (CNN), and exemplar based techniques using the Non-negative Matrix Factorization (NMF) or the like.

Most of these techniques learn the conversion function so that the sound feature value of the converted voice approaches the sound feature value of the target voice as much as possible using parallel data that includes a time aligned voice pair of the same utterance content. However, in some applications, it is often difficult to provide pair data of a conversion-source voice and a target voice of the same utterance content. In addition, even if the pair data can be provided, time alignment may be required at high accuracy, and automatic time alignment may need visual and manual pre-screening to correct misalignment.

Meanwhile, a non-parallel voice conversion method has also been proposed that does not necessarily need parallel data. An example is a method using voice recognition. This method constructs the parallel data by pairing the sound feature values in a time frame recognized as the same phoneme in the conversion-source voice and the conversion-target voice. Because parallel data is constructed, it is assumed that the voice recognition can be performed on the object voice at high accuracy. But, if the voice recognition has a poor accuracy, it has limited performance. Methods specific to the task of converting the speaker individuality include a speaker adaptation technology. This method does not need the parallel data of the conversion-source voice and the conversion-target voice, but it may need to use parallel data of a reference voice to learn the speaker space. It has recently been proposed to use a non-parallel voice conversion based on the Conditional Variational Autoencoder (CVAE) as a method that does not need data such as a text label and reference voice, a module such as voice recognition, or parallel data at all (NPL 1 and NPL 2). A purpose of this method is to learn, using a sound feature value of a learning sample, an encoder NN that outputs, from input of a sound feature value, parameters of a conditional distribution of a latent variable and a decoder NN that outputs, for input of a latent variable, parameters of a conditional distribution of a sound feature value.

In so doing, using the attribution code corresponding to each sample as an auxiliary input to the decoder and encoder, the encoder and decoder are learned so that the conditional distributions of the encoder and decoder represent the conditional distribution of the latent variable conditioned with the attribution code and the conditional distribution of the sound feature value conditioned with the attribution code, respectively. By providing the encoder and decoder learned in this way with the sound feature value of the conversion-source voice and the desired attribution code, a sound feature value of the desired attribution can be generated while keeping the utterance content of the conversion-source voice. As described above, this scheme has an advantage that parallel data is not necessary, while the feature amount of the generated voice tends to be excessively smoothed, which contributes to the limited quality of the converted voice. This is because, as the conditional distribution of the decoder, a parametric probability distribution such as the gauss distribution is assumed and the assumed distribution does not coincide the true probability distribution that the sound feature amount actually follows. A recently proposed approach that can solve this problem is a non-parallel voice conversion using the Generative Adversarial Network (GAN) (NPL 3). This method models, using the NN, conversion functions G and F between voices of different attributions and an identifier D for identifying whether the input is a feature value of the real voice or a feature value of a synthetic voice. The method then learns the functions G and F and the identifier D using three types of criteria of the adversarial learning criterion, the cycle-consistent criterion, and the identity conversion criterion. The adversarial learning criterion refers to a loss function of the identifier D. The D is learned to increase this criterion, while the G and F are learned to decrease the criterion. Specifically, this means facilitating the learning to prevent that the sound feature value converted by the G and F are wrongly identified as the real voice (undistinguished from the real voice) by the D. The cycle-consistent criterion refers to a reconstruction error when the sound feature value converted by one of the G and F is reversely converted by the other conversion function. Learning the G and F to decrease this criterion can facilitate the learning such that the G and F are one-to-one conversions. In addition, the identity conversion criterion refers to a conversion error that represents the amount of change when the sound feature value of the conversion target attribution is an input to the conversion function. The G and F are learned to decrease this criterion as much as possible. These criteria can provide a function that converts, without using parallel data, only the attribution while keeping the utterance content. Such a, the scheme of learning the conversion function of data between two types of attributions is referred to as the Cycle-consistency Adversarial Network (CycleGAN). The method applying the CycleGAN to the voice conversion task is referred to as the CycleGAN voice conversion (NPL 3).

CITATION LIST

Non-Patent Literature

[NPL 1] C.-C. Hsu, H.-T. Hwang, Y.-C. Wu, Y. Tsao, and H.-M. Wang, "Voice conversion from non-parallel corpora using variational auto-encoder", in Proc. APSIPA, 2016, pp. 1-6.
[NPL 2] C.-C. Hsu, H.-T. Hwang, Y.-C. Wu, Y. Tsao, and H.-M. Wang, "Voice conversion from unaligned corpora using variational auto encoding Wasserstein generative adversarial networks", in Proc. Interspeech, 2017, pp. 3364-3368.
[NPL 3] Takuhiro Kaneko, Hirokazu Kameoka, "Parallel-data-free voice conversion using cycle-consistent adversarial networks," eprintarXiv:1711.11293, November 2017.

SUMMARY OF THE INVENTION

Technical Problem

This method has an advantage that it may provide a sound feature value similar to the true probability distribution followed by the sound feature value of the real voice without explicitly assuming the probability distribution of the sound feature value unlike the CVAE scheme, by introducing the adversarial learning criterion. Meanwhile, because this method is limited to the interconversion between two types of attributions, the conversion to the multiple attributions using this method needs to learn the conversion functions for all combinations of pairs of attributions. This explodes the number of parameters to be learned as the types of attributions increase, thus making it difficult to learn the parameters.

As described above, both of the CVAE and CycleGaN schemes have advantages and disadvantages and still have problems to be solved. In addition, because both schemes do not consider the degree of the target attribution of the converted voice as the direct criterion, it is believed that the effect of the attribution conversion is limited.

The present invention is provided to solve the above problems and the purpose thereof is to provide a voice conversion learning device, method, and program that may learn a converter that may convert to a voice of the desired attribution.

Another purpose of the present invention is to provide a voice conversion device, method, and program that may convert to a voice of the desired attribution.

Means for Solving the Problem

To achieve the above purpose, a voice conversion learning device according to the present invention is configured by including a learning unit, the learning unit learning, on the basis of a sound feature value series for each of conversion-source voice signals with different attributions, and attribution codes indicating each attribution of the conversion-source voice signals, a converter for converting, for input of a sound feature value series and an attribution code, to a sound feature value series of a voice signal of an attribution indicated by the attribution code, the learning unit learning the converter to minimize a value of a learning criterion represented using: real voice similarity of a sound feature value series converted by the converter for input of any attribution code, the real voice similarity being associated with the any attribution code, the real voice similarity being identified a voice identifier for identifying, for input of an attribution code, whether a voice is a real voice with an attribution indicated by the attribution code or a synthetic voice; attribution code similarity of a sound feature value series converted by the converter for input of any attribution code, the attribution code similarity being similarity to the any attribution code identified by an attribution identifier; an error between a sound feature value series reconverted from the sound feature value series converted by the converter for input of an attribution code different from the attribution code of the conversion-source voice signal, the reconversion being done by the converter for input of the attribution code of the conversion-source voice signal, and the sound feature value series of the conversion-source voice signal; and a distance between the sound feature value series converted by the converter for input of the attribution code of the conversion-source voice signal and the sound feature value series of the conversion-source voice signal, the learning unit learning the voice identifier to minimize a value of a learning criterion represented using: real voice similarity of a sound feature value series converted by the converter for input of any attribution code, the real voice similarity being associated with the any attribution code, the real voice similarity being identified by the voice identifier for identifying, for input of an attribution code, whether a voice is a real voice with an attribution indicated by the attribution code or a synthetic voice; and real voice similarity indicated by the attribution code of the sound feature value series of the conversion-source voice signal, the real voice similarity being identified by the voice identifier for input of the attribution code of the conversion-source voice signal, and the learning unit learning the attribution identifier to minimize a value of a learning criterion represented using attribution code similarity of the sound feature value series of the conversion-source voice signal, the attribution code similarity being of the conversion-source voice signal identified by the attribution identifier.

In addition, a voice conversion learning method according to the present invention includes learning, by a learning unit, on the basis of a sound feature value series for each of conversion-source voice signals with different attributions, and attribution codes indicating each attribution of the conversion-source voice signals, a converter for converting, for input of a sound feature value series and an attribution code, to a sound feature value series of a voice signal of an attribution indicated by the attribution code, learning the converter to minimize a value of a learning criterion represented using: real voice similarity of a sound feature value series converted by the converter for input of any attribution code, the real voice similarity being associated with the any attribution code, the real voice similarity being identified a voice identifier for identifying, for input of an attribution code, whether a voice is a real voice with an attribution indicated by the attribution code or a synthetic voice; attribution code similarity of a sound feature value series converted by the converter for input of any attribution code, the attribution code similarity being similarity to the any attribution code identified by an attribution identifier; an error between a sound feature value series reconverted from the sound feature value series converted by the converter for input of an attribution code different from the attribution code of the conversion-source voice signal, the reconversion being done by the converter for input of the attribution code of the conversion-source voice signal, and the sound feature value series of the conversion-source voice signal; and a distance between the sound feature value series converted by the converter for input of the attribution code of the conversion-source voice signal and the sound feature value series of the conversion-source voice signal, learning the voice identifier to minimize a value of a learning criterion represented using: real voice similarity of a sound feature value series converted by the converter for input of any attribution code, the real voice similarity being associated with the any attribution code, the real voice similarity being identified by the voice identifier for identifying, for input of an attribution code, whether a voice is a real voice with an attribution indicated by the attribution code or a synthetic voice; and real voice similarity indicated by the attribution code of the sound feature value series of the conversion-source voice signal, the real voice similarity being identified by the voice identifier for input of the attribution code of the conversion-source voice signal, and learning the attribution identifier to minimize a value of a learning criterion represented using attribution code similarity of the sound feature value series of the conversion-source voice signal, the attribution code similarity being of the conversion-source voice signal identified by the attribution identifier.

A voice conversion device according to the present invention includes a voice conversion unit, the voice conversion unit being for estimating a sound feature value series of a target voice signal from a sound feature value series in an input conversion-source voice signal and an attribution code indicating an attribution of the target voice signal, using a converter for converting, for input of a sound feature value series and an attribution code, to a sound feature value series of a voice signal of an attribution indicated by the attribution code, the converter being previously learned to minimize, on the basis of a sound feature value series for each of conversion-source voice signals with different attributions, and attribution codes indicating each attribution of the conversion-source voice signals, a value of a learning criterion represented using: real voice similarity of a sound feature value series converted by the converter for input of any attribution code, the real voice similarity being associated with the any attribution code, the real voice similarity being identified a voice identifier for identifying, for input of an attribution code, whether a voice is a real voice with an attribution indicated by the attribution code or a synthetic voice; attribution code similarity of a sound feature value series converted by the converter for input of any attribution code, the attribution code similarity being similarity to the any attribution code identified by an attribution identifier; an error between a sound feature value series reconverted from the sound feature value series converted by the converter for input of an attribution code different from the attribution code of the conversion-source voice signal, the reconversion being done by the converter for input of the attribution code of the conversion-source voice signal, and the sound feature value series of the conversion-source voice signal; and a distance between the sound feature value series converted by the converter for input of the attribution code of the conversion-source voice signal and the sound feature value series of the conversion-source voice signal, the voice identifier being previously learned to minimize a value of a learning criterion represented using: real voice similarity of a sound feature value series converted by the converter for input of any attribution code, the real voice similarity being associated with the any attribution code, the real voice similarity being identified by the voice identifier for identifying, for input of an attribution code, whether a voice is a real voice with an attribution indicated by the attribution code or a synthetic voice; and real voice similarity indicated by the attribution code of the sound feature value series of the conversion-source voice signal, the real voice similarity being identified by the voice identifier for input of the attribution code of the conversion-source voice signal, and the attribution identifier being previously learned to minimize a value of a learning criterion represented using attribution code similarity of the sound feature value series of the conversion-source voice signal, the attribution code similarity being of the conversion-source voice signal identified by the attribution identifier.

In addition, a voice conversion method according to the present invention includes: estimating, by a voice conversion unit, a sound feature value series of a target voice signal from a sound feature value series in an input conversion-source voice signal and an attribution code indicating an attribution of the target voice signal, using a converter for converting, for input of a sound feature value series and an attribution code, to a sound feature value series of a voice signal of an attribution indicated by the attribution code, the converter being previously learned to minimize, on the basis of a sound feature value series for each of conversion-source voice signals with different attributions, and attribution codes indicating each attribution of the conversion-source voice signals, a value of a learning criterion represented using: real voice similarity of a sound feature value series converted by the converter for input of any attribution code, the real voice similarity being associated with the any attribution code, the real voice similarity being identified a voice identifier for identifying, for input of an attribution code, whether a voice is a real voice with an attribution indicated by the attribution code or a synthetic voice; attribution code similarity of a sound feature value series converted by the converter for input of any attribution code, the attribution code similarity being similarity to the any attribution code identified by an attribution identifier; an error between a sound feature value series reconverted from the sound feature value series converted by the converter for input of an attribution code different from the attribution code of the conversion-source voice signal, the reconversion being done by the converter for input of the attribution code of the conversion-source voice signal, and the sound feature value series of the conversion-source voice signal; and a distance between the sound feature value series converted by the converter for input of the attribution code of the conversion-source voice signal and the sound feature value series of the conversion-source voice signal, the voice identifier being previously learned to minimize a value of a learning criterion represented using: real voice similarity of a sound feature value series converted by the converter for input of any attribution code, the real voice similarity being associated with the any attribution code, the real voice similarity being identified by the voice identifier for identifying, for input of an attribution code, whether a voice is a real voice with an attribution indicated by the attribution code or a synthetic voice; and real voice similarity indicated by the attribution code of the sound feature value series of the conversion-source voice signal, the real voice similarity being identified by the voice identifier for input of the attribution code of the conversion-source voice signal, and the attribution identifier being previously learned to minimize a value of a learning criterion represented using attribution code similarity of the sound feature value series of the conversion-source voice signal, the attribution code similarity being of the conversion-source voice signal identified by the attribution identifier.

In addition, a program according to the present invention is a program for allowing a computer to function as each part in the voice conversion learning device according to the above invention or each part in the voice conversion device according to the above invention.

Effects of the Invention

A voice conversion learning device, a method, and a program according to the present invention may provide an effect that a converter may be learned that may convert to a voice of the desired attribution by learning the converter to minimize a value of a learning criterion represented using: real voice similarity of a sound feature value series converted by the converter for input of any attribution code, the real voice similarity being associated with the any attribution code, the real voice similarity being identified a voice identifier; attribution code similarity of a sound feature value series converted by the converter for input of any attribution code, the attribution code similarity being similarity to the any attribution code identified by an attribution identifier; an error between a sound feature value series reconverted from the sound feature value series converted by the converter for input of an attribution code different from the attribution code of the conversion-source voice signal, the reconversion being done by the converter for input of the attribution code of the conversion-source voice signal, and the sound feature value series of the conversion-source voice signal; and a distance between the sound feature value series converted by the converter for input of the attribution code of the conversion-source voice signal and the sound feature value series of the conversion-source voice signal, learning the voice identifier to minimize a value of a learning criterion represented using: real voice similarity of a sound feature value series converted by the converter for input of any attribution code, the real voice similarity being associated with the any attribution code, the real voice similarity being identified by the voice identifier; and real voice similarity indicated by the attribution code of the sound feature value series of the conversion-source voice signal, the real voice similarity being identified by the voice identifier for input of the attribution code of the conversion-source voice signal, and learning the attribution identifier to minimize a value of a learning criterion represented using attribution code similarity of the sound feature value series of the conversion-source voice signal, the attribution code similarity being of the conversion-source voice signal identified by the attribution identifier.

A voice conversion device, a method, and a program according to the present invention may provide an effect that may convert to a voice of the desired attribution by estimating a sound feature value series of a target voice signal from a sound feature value series in an input conversion-source voice signal and an attribution code indicating an attribution of the target voice signal, using a converter obtained by learning the converter to minimize a value of a learning criterion represented using: real voice similarity of a sound feature value series converted by the converter for input of any attribution code, the real voice similarity being associated with the any attribution code, the real voice similarity being identified a voice identifier; attribution code similarity of a sound feature value series converted by the converter for input of any attribution code, the attribution code similarity being similarity to the any attribution code identified by an attribution identifier; an error between a sound feature value series reconverted from the sound feature value series converted by the converter for input of an attribution code different from the attribution code of the conversion-source voice signal, the reconversion being done by the converter for input of the attribution code of the conversion-source voice signal, and the sound feature value series of the conversion-source voice signal; and a distance between the sound feature value series converted by the converter for input of the attribution code of the conversion-source voice signal and the sound feature value series of the conversion-source voice signal, learning the voice identifier to minimize a value of a learning criterion represented using: real voice similarity of a sound feature value series converted by the converter for input of any attribution code, the real voice similarity being associated with the any attribution code, the real voice similarity being identified by the voice identifier; and real voice similarity indicated by the attribution code of the sound feature value series of the conversion-source voice signal, the real voice similarity being identified by the voice identifier for input of the attribution code of the conversion-source voice signal, and learning the attribution identifier to minimize a value of a learning criterion represented using attribution code similarity of the sound feature value series of the conversion-source voice signal, the attribution code similarity being of the conversion-source voice signal identified by the attribution identifier.

DESCRIPTION OF EMBODIMENTS

Figure 1:
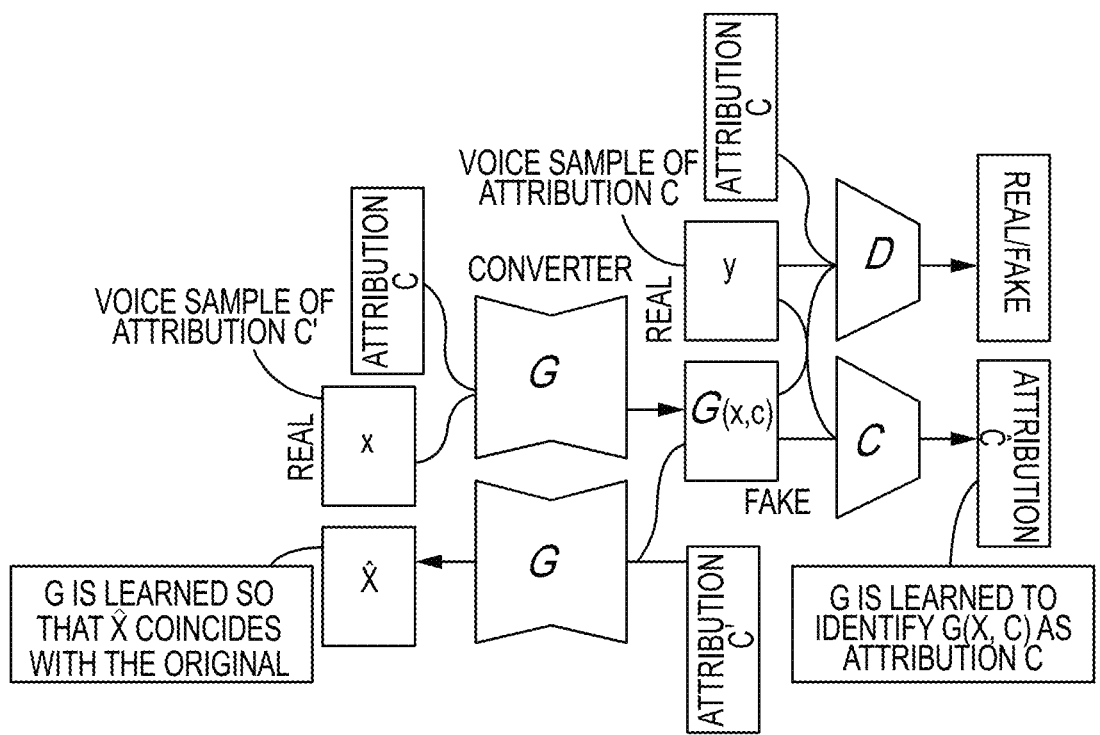
FIG. 1 illustrates an overview of a voice conversion method according to an embodiment of the present invention.

Embodiments of the present invention will be described in more detail below with reference to the drawings.

<Overview According to Embodiments of the Present Invention>

An overview according to the embodiments of the present invention will first be described.

The embodiment of the present invention proposes a non-parallel voice conversion technique that may overcome the above problems and limitation of the conventional technology. Advantages of the method according to the embodiments of the present invention include: (1) that data such as a text label and reference voice or a module such as a voice recognition are not additionally needed; (2) that excessive smoothing of audio parameter, which is often a problem in many conventional voice conversion methods, is less likely to occur; (3) that conversion is possible that reflects time dependence of the voice of the conversion source and target; (4) that the learning criterion includes a degree of the target attribution in the converted voice measured by an attribution identifier; and (5) that a single NN expresses the converter to multiple attributions (the number of parameters to be learned remains almost unchanged for the number of attributions).

The above advantages of the method according to the embodiments of the present invention may be achieved by the following (a) to (d).

(a) The converter G, the real voice/synthetic voice identifier D, and the attribution identifier C are modified by the NN.

(b) The sound feature value series is use as an input to various types of NNs.

(c) The attribution code is used as an auxiliary input to the converter G and the real voice/synthetic voice identifier D.

(d) Learning criteria of the adversarial learning criterion, the cycle-consistent criterion, reconstruction error criterion, and the attribution identification criterion is used to learn the converter G, the real voice/synthetic voice identifier D, and the attribution identifier C.

<Principle of Embodiments of the Present Invention>
<Voice Conversion by Cyclegan (Conventional Method)>

$$x \in \mathbb{R}^{Q \times N}, y \in \mathbb{R}^{Q \times M}$$

are used as the arrangements representing the sound feature value (such as the mel-cepstrum coefficient and power spectrum) series of the voices of the attributions c and c', respectively. An object of the CycleGAN voice conversion is to learn, using non-parallel learning samples x and y, a converter for converting x to the attribution c', $$G: \mathbb{R}^{Q \times N} \to \mathbb{R}^{Q \times N}$$

and a converter for converting y to the attribution c, $$F: \mathbb{R}^{Q \times M} \to \mathbb{R}^{Q \times M}$$

It is here considered that the identifier $D_X$ for identifying whether the attribution c is the real voice or not and the identifier $D_Y$ for identifying whether the attribution c' is the real voice or not are used to define the adversarial learning criterion $$\mathcal{L}_{adv}(G,F,D_X,D_Y)$$

as the following,

[Formula 1]

$$\mathcal{L}_{adv}(G, F, D_X, D_Y) = \qquad (1)$$
$$\mathbb{E}_{y \sim pY(y)}[\log D_Y(y)] + \mathbb{E}_{x \sim px(x)}[\log(1 - D_Y(G(x)))] +$$
$$\mathbb{E}_{x \sim px(x)}[\log D_X(x)] + \mathbb{E}_{y \sim pY(y)}[\log(1 - D_X(F(y)))]$$

and this criterion is used to learn the G and F as well as the $D_X$ and $D_Y$. The criterion has a large value when the $D_X$ correctly identifies x as the real voice and the F(y) as the synthetic voice and when the $D_Y$ correctly identifies y as the real voice and the G(x) as the synthetic voice.

By learning the $D_X$ and $D_Y$ to increase the criterion and learning the G and F to decrease the criterion, it may become difficult for the $D_X$ and $D_Y$ to distinguish the sound feature value converted by the G and F from the real voice. This is the key in the present scheme to provide the converted voice of high quality. In addition, the cycle-consistent criterion $$\mathcal{L}_{cyc}(G,F)$$

and identity conversion criterion $$\mathcal{L}_{id}(G,F)$$

are defined as the following, respectively.

Figure 12:
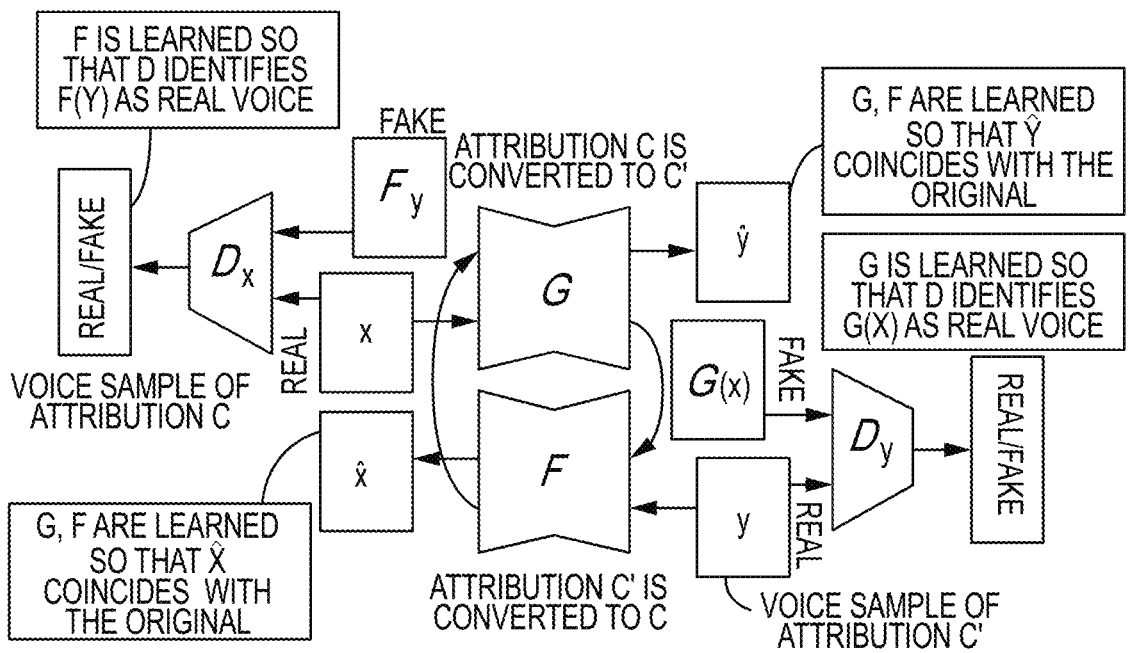
FIG. 12 illustrates the overview of the voice conversion method according to the conventional technique.

[Formula 2]

$$\mathcal{L}_{cyc}(G, F) = \mathbb{E}_{x \sim px(x)}[\|F(G(x)) - x\|_1] + \mathbb{E}_{y \sim py(y)}[\|G(F(y)) - y\|_1] \qquad (2)$$

$$\mathcal{L}_{id}(G, F) = \mathbb{E}_{x \sim px(x)}[\|F(G(x)) - x\|_1] + \mathbb{E}_{y \sim py(y)}[\|G(y) - y\|_1] \qquad (3)$$

$$\mathcal{L}_{cyc}(G,F)$$

is minimized when x coincides with the original x after x is converted by the G and then converted by the F and when y coincides with the original y after y is converted by the F and then converted by the G. Meanwhile, $$\mathcal{L}_{id}(G,F)$$

is minimized when the G receiving y as input outputs no change from y and when the F receiving x as input outputs no change from x. Learning the G and F to decrease those criteria may facilitate the learning such that the G and F are both one-to-one conversions. This is the key in providing the non-parallel voice conversion. The weighted sum of the above three types of criteria $$\mathcal{L}_{full}(G, F, D_X, D_Y) = \qquad (4)$$
$$\mathcal{L}_{adv}(G, F, D_X, D_Y) + \lambda_{cyc}\mathcal{L}_{cyc}(G, F) + \lambda_{id}\mathcal{L}_{id}(G, F)$$

the learning criterion for the G, F, Dx, and DY. By iteratively updating the parameters of the G and F to decrease $$\mathcal{L}_{full}(G,F,D_X,D_Y)$$

and iteratively updating the parameters of the $D_X$ and $D_Y$ to increase $$\mathcal{L}_{full}(G,F,D_X,D_Y)$$

it may be possible to provide functions G and F for inter-converting the sound feature values of the voices of the attributions c and c' (see FIG. 12). As described above, this scheme is a method for learning a converter between two attributions. Thus, to be able to directly use the scheme for conversion to the multiple attributions, it is necessary to prepare NNs corresponding to the G, F, $D_X$, and $D_Y$ for each attribution pair. Because the combination of the attribution pair increases in the square order as the number of attributions increases, the number of parameters to be learned increases accordingly, thus making it difficult to learn the parameters.

<StarGAN Voice Conversion (Method according to Embodiment of the Present Invention)>
<Learning Method I>

In a method according to an embodiment of the present invention, an NN is used that receives the sound feature value series $$x \in \mathbb{R}^{Q \times N}$$

and the attribution code c as the auxiliary input to configure the converter G for multiple attributions. Specifically, $$\hat{y} = G(x, c)$$

is considered as an input x of any attribution that is converted to the attribution c. The purpose is to make this variable $$\hat{y} = G(x, c)$$

to be the sound feature value series that is like the real voice and has the attribution c. Thus, first, the identifier D for identifying whether it is the real voice or synthetic voice and the attribution identifier C for identifying the attribution are introduced and the loss functions of the D and C are considered as the learning criteria of the G, D, and C (see FIG. 1). Here, it is assumed that each attribution is characterized by I types of categories and each category has a plurality of classes provided with different labels. Therefore, the attribution c is expressed by I class labels. It is now assumed that the real voice class has a label of 1, the synthetic voice class has a label of 0, and c is a binary vector that couples 1 one-hot vectors, each indicating the corresponding class in each category, as follows.

[Formula 4]

$$c = [c_1, \ldots, c_I] \quad (5)$$

$$c_i = [c_{i,1}, \ldots, c_{i,J}] \quad (6)$$

For example, if i is the "speaker" category, j=1, 2, ..., J is a speaker ID and if i is the "gender" category, j=1, 2 represents male/female. Here, it is assumed that the D and C are functions represented by the NN as follows, respectively.

$$D: \mathbb{R}^{Q \times N} \times \{0, 1\}^{I \times J} \to [0, 1]^{Q' \times N'}, \quad C: \mathbb{R}^{R \times N} \to [0, 1]^{Q' \times N' \times I \times J}$$

Specifically, it is assumed that the D is a function that receive the sound feature value series and the attribution code c belonging to $\{0, 1\}^{I \times J}$ as input and outputs the probability representing how much the sound feature value series is like the real voice in a region (q', n') and the C is a function that receives the sound feature value series as input and outputs the probability representing how much the sound feature value series is like the class j of the category I in the region (q', n'). Therefore, $D_{q',n'}(y, c)$, which is the (q'×n')th element of the D(y, c), is the probability representing how much y is like the real voice in the region (q', n'), and meets

[Formula 5]

$$0 \leq D_{q',n'}((y,c)) \leq 1 \quad (7)$$

and the element $C_{q',n',i,j}(y)$ of the C (y) corresponds to the probability of the class j of the category i in the region (q', n') and meets

[Formula 6]

$$0 \leq C_{q',n',i,j}(y) \leq 1, \ \Sigma_j C_{q',n',i,j}(y) = 1 \quad (8)$$

If the cross-entropy criterion is used as the loss functions of the D and C, it may be written as follows.

[Formula 7]

$$\mathcal{L}_{adv}^D(D) = -\mathbb{E}_{c \sim p(c), y \sim p(y|c)} \left[ \sum_{q',n'} \log D_{q',n'}(y, c) \right] - \quad (9)$$

$$\mathbb{E}_{c \sim p(c), x \sim px(x)} \left[ \sum_{q',n'} \log(1 - D_{q',n'}(G(x, c), c)) \right]$$

$$\mathcal{L}_{cls}^C(C) = -\mathbb{E}_{c \sim p(c), y \sim p(y|c)} \left[ \sum_{q',n'} \log C_{q',n'}(y) \right] \quad (10)$$

Note, however, that the $C_{q',n'}(y)$ represents the probability representing how much y is adapted to the attribution code c in the region (q', n'), as follows.

[Formula 8]

$$C_{q',n'}(y) = \prod_i \prod_j C_{q',n',i,j}(y)^{c_{i,j}} \quad (11)$$

Note that $$\Pi_j C_{q',n',i,j}(y)^{c_{i,j}}$$

corresponds to the operation of extracting, from the C(y), the probability value that corresponds to the class j.

$$c_{i,j} = 1$$

$$\mathcal{L}_{adv}^D(D)$$

is a criterion that has a small value when the D correctly identifies whether the input is the sound feature value of the real voice series or the sound feature value series of the synthetic voice, i.e., when the D (•, c) receives the sound feature value of the real voice series y as input, the following is obtained, $$D_{q',n'}(y,c) \simeq 1$$

and when the sound feature value series G (x, c) of the converted voice is input, the following is obtained.

$$D_{q',n'}(y,c) \simeq 1$$

Meanwhile, $$\mathcal{L}_{cls}^C(C)$$

is a criterion that has a small value when the C correctly identifies the sound feature value of the voice of the attribution c as the attribution c. Therefore, the D and C may only be learned to decrease the above criteria as much as possible. Meanwhile, for the converter G, in order that the D identifies the G (x, c) as the real voice and the C identifies it as the attribution c, the following criteria

[Formula 9]

$$\mathcal{L}_{adv}^{G}(G) = -\mathbb{E}_{c\sim p(c), x\sim p(x)}\left[\sum_{q',n'} \log D_{q',n'}(G(x,c), c)\right] \quad (12)$$

$$\mathcal{L}_{cls}^{G}(G) = -\mathbb{E}_{c\sim p(c), x\sim p(x)}\left[\sum_{q',n'} \log C_{q',n'}(G(x,c))\right] \quad (13)$$

or

[Formula 10]

$$\mathcal{L}_{adv}^{G}(G) = -\mathbb{E}_{c\sim p(c), x\sim p(x)}\left[\sum_{q',n'} \log(1 - D(G(x,c), c))\right] \quad (14)$$

$$\mathcal{L}_{cls}^{G}(G) = -\mathbb{E}_{c\sim p(c), x\sim p(x)}\left[\sum_{q',n'} \log C_{q',n'}(G(x,c))\right] \quad (15)$$

are considered and the converter G may only be learned to decrease the formula (12) and (13) or the formula (14) and (15).

As the loss functions of the D and C, the square error criterion may be used in addition to the cross entropy. In this case, as the following criteria, $$\mathcal{L}_{adv}^{D}(D), \mathcal{L}_{cls}^{C}(C), \mathcal{L}_{adv}^{G}(G), \mathcal{L}_{cls}^{G}(G)$$

the following formulae may be used, for example.

[Formula 11]

$$\mathcal{L}_{adv}^{D}(D) = \mathbb{E}_{c\sim p(c), y\sim p(y|c)}\left[\sum_{q',n'}(D_{q',n'}(y,c) - 1)^2\right] \quad (16)$$
$$+ \mathbb{E}_{c\sim p(c), x\sim p(x)}\left[\sum_{q',n'} D_{q',n'}(G(x,c), c)^2\right]$$

$$\mathcal{L}_{cls}^{D}(C) = \mathbb{E}_{c\sim p(c), y\sim p(y|c)}\left[\sum_{q',n'}(C_{q',n'}(y) - 1)^2\right] \quad (17)$$

$$\mathcal{L}_{adv}^{G}(G) = \mathbb{E}_{c\sim p(c), x\sim p(x)}\left[\sum_{q',n'}(D_{q',n'}(G(x,c), c) - 1)^2\right] \quad (18)$$

$$\mathcal{L}_{cls}^{G}(G) = \mathbb{E}_{c\sim p(c), x\sim p(x)}\left[\sum_{q',n'}(C_{q',n'}(G(x,c)) - 1)^2\right] \quad (19)$$

The formulae (17) and (19) are criteria that have a small value when the product (simultaneous probability) of the class probabilities of all categories of the c is near 1. The criteria may be those that have a small value when the class probability of each category

[Formula 12]

$$C_{q',n'}(y) = \prod_{j=1}^{J} C_{q',n',i,j}(y)^{c_{i,j}} \quad (20)$$

has a value near 1. Thus, criteria such as the following may be used instead.

[Formula 13]

$$\mathcal{L}_{cls}^{C}(C) = \frac{1}{I}\mathbb{E}_{c\sim p(c), y\sim p(y|c)}\left[\sum_{q',n'}\sum_{i=1}^{I}(C_{q',n',i}(y) - 1)^2\right] \quad (21)$$

-continued $$\mathcal{L}_{cls}^{G}(G) = \frac{1}{I}\mathbb{E}_{c\sim p(c), x\sim p(x)}\left[\sum_{q',n'}\sum_{i=1}^{I}(C_{q',n',i}(G(x,c)) - 1)^2\right] \quad (22)$$

Learning using only the above criteria cannot ensure that the converted voice by the G may keep the utterance content of the input voice. Thus, like the CycleGaN, the cycle-consistent criterion is introduced as follows.

[Formula 14]

$$\mathcal{L}_{cyc}^{G}(G) = \mathbb{E}_{c\sim p(c), c'\sim p(c), x\sim p(x|c')}\|G(G(x,c), c') - x\|_{\rho}^{\rho} \quad (23)$$

Note, however, that, ρ is assumed to be a positive real number. Specifically, the above criterion is a criterion that has a small value when the sound feature value series x of the input voice of the attribution c' coincides with the original x after x is converted to the attribution c and then reconverted to the attribution c'.

In addition, because the sound feature value series x of the input voice of the attribution c should also coincide with x after it is converted to the same attribution c, the reconstruction error criterion such as the following is also considered.

[Formula 15]

$$\mathcal{L}_{rec}^{G}(G) = \mathbb{E}_{c\sim p(c), x\sim p(x|c')}\|G(x,c) - x\|_{\rho}^{\rho} \quad (24)$$

From the above, the learning criteria to be minimized with respect to the G, D, and C are respectively

[Formula 16]

$$I_G(G) = \mathcal{L}_{adv}^{G}(G) + \lambda_{cls}\mathcal{L}_{cls}^{G}(G) + \lambda_{cyc}\mathcal{L}_{cyc}^{G}(G) + \lambda_{rec}\mathcal{L}_{rec}^{G}(G) \quad (25)$$

$$I_D(D) = \mathcal{L}_{adv}^{D}(D) \quad (26)$$

$$I_C(C) = \mathcal{L}_{cls}^{C}(C) \quad (27)$$

Because the G, D, and C are all expressed by the NN, the G, D, and C may be learned using the above criteria by iteratively updating each NN parameter by the Backpropagation.

<Learning Method II>

Figure 2:
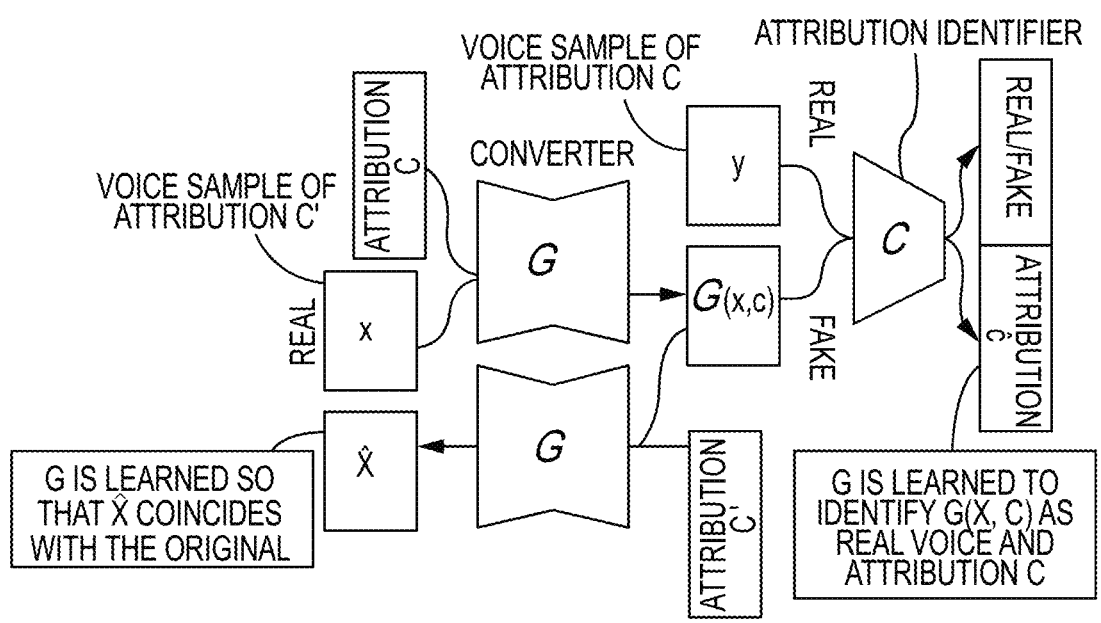
FIG. 2 illustrates an overview of another example of a voice conversion method according to an embodiment of the present invention.

Although it is assumed in the above learning method I that the real voice/synthetic voice identifier D and the attribution identifier C are configured using different NNs, a method may be possible where only the C may take on the real voice/synthetic voice identification and the attribution identification as shown in FIG. 2 by considering the identification of whether it is the real voice or synthetic voice as one category of the attribution. In this case, in the above scheme, for example, i=1 is set to be the attribution category representing whether the voice is the real voice or synthetic voice, $C_{q', n', 1}(y)$ is replaced with $D_{q', n'}(y)$, and $C_{q', n', 2}(y), \ldots, C_{q', n', I}(y)$ are replaced with C, and then the formulae (25) to (27) may be used as the learning criteria.

<About Configuration of NN>

A voice has different ways of speaking and voice changing depending on the context and utterance content. Therefore, it is preferable that a function for converting the sound feature value has time dependence (i.e., the function is determined depending on the historical record of the sound feature value series of the input and output voices). Then, the embodiment of the present invention models the respective NNs, with the RNN such as the Long Short-Term Memory (LSTM) and Birectional LSTM (BiLSTM), CNN including convolution in time direction, the gated CNN, or the like to allow G, D, C to perform conversion and identification that may reflect the time dependence of the sound feature value of the voice.

<Conversion Method (Method According to an Embodiment of the Present Invention)>

The sound feature vector includes, (A1) a vector having a logarithmic amplitude spectrum as an element, (A2) a vector having a mel-cepstrum coefficient as an element, (A3) a vector having a linear predictive coefficient as an element, (A4) a vector having a Partial Correlation (PARCOR) coefficient as an element, and (A5) a vector having a Line Spectral Pair (LSP) parameter as an element.

(A1) may be obtained by time-frequency analysis such as the STFT and wavelet transform, (A2) by the mel-cepstrum analysis, (A3) by the linear predictive analysis, (A4) by the PARCOR analysis, and (A5) by the LSP analysis. In addition, (A1) may be a spectrum envelope obtained by the STRAIGHT analysis, the WORLD analysis or the like, and (A2-A5) may be obtained from the spectrum envelope by applying the respective analyses thereto. For example, the following (B1-B5) may be used as the sound feature vector.

(B1) A vector having a log-spectrum envelope as an element, (B2) a vector having a mel-cepstrum coefficient from B1 as an element, (B3) a vector having a linear predictive coefficient from B1 as an element, (B4) a vector having a PARCOR coefficient from B1 as an element, and (B5) a vector having an LSP parameter from B1 as an element.

After completion of learning the G, the sound feature value series x of the input voice and the target attribution code c may be input to the G to provide the sound feature value series of the converted voice.

$$\hat{x} = G(x, c)$$

The resulting sound feature value series $$\hat{x}$$

may provide the converted voice by the calculation process of the time domain signal in response to the calculation process of the sound feature value. For example, the converted voice may be provided by using the reverse conversion (such as the reverse STFT, the wavelet reverse conversion) of the time-frequency analysis if the (A1) is used as the sound feature value, and by using the vocoder if the (A2)-(A5) and (B1)-(B5) are used.

<Configuration of Voice Conversion Learning Device According to an Embodiment of the Present Invention>

Figure 3:
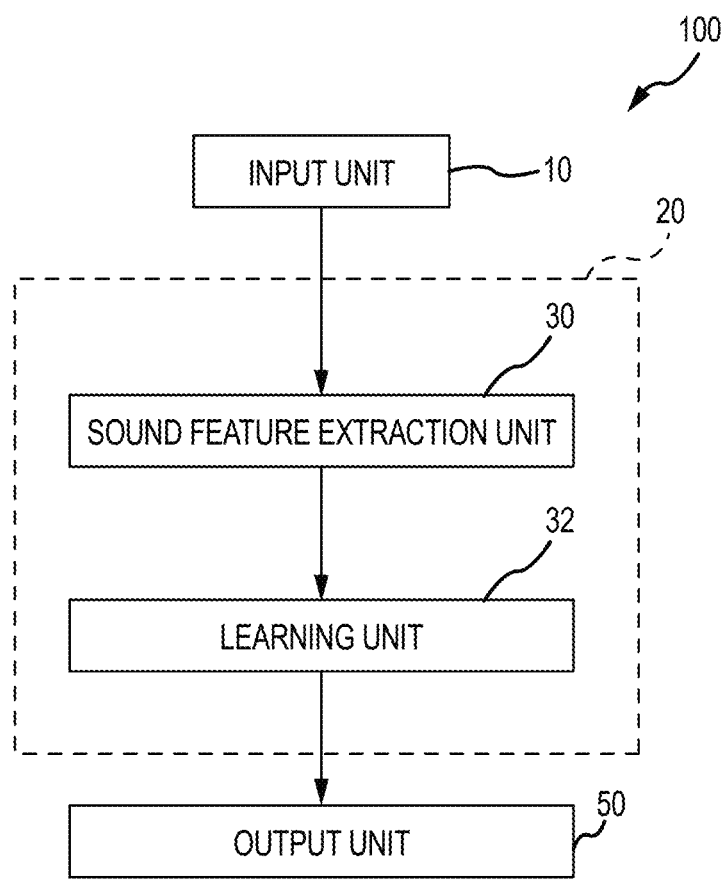
FIG. 3 is a block diagram of a configuration of a voice conversion learning device according to an embodiment of the present invention.

A description will now be given of the configuration of the voice conversion learning device according to an embodiment of the present invention. As shown in FIG. 3, the voice conversion learning device 100 according to the embodiment of the present invention may be configured by a computer including a CPU, a RAM, and a ROM that stores a program and various data for performing a voice conversion learning process routine described below. The voice conversion learning device 100 includes, from a functional point of view, an input unit 10, an operation unit 20, and an output unit 50, as shown in FIG. 3.

The input unit 10 receives each of the conversion-source voice signals with different attributions and the attribution code representing each attribution of the conversion-source voice signals. Note that the attribution code indicating the attribution of the conversion-source voice signal may be provided manually. In addition, the attribution of the voice signal includes, for example, gender, adults/children, speaker ID, whether native speaker or not (national origin), the type of utterance mood (such as anger and sadness), and utterance mode (such as lecture-like and free utterance-like).

The operation unit 20 is configured by including a sound feature extraction unit 30 and a learning unit 32.

The sound feature extraction unit 30 extracts the sound feature value series from each of the input conversion-source voice signals.

The learning unit 32 learns, on the basis of the sound feature value series in each of the conversion-source voice signals and the attribution code representing each attribution of the conversion-source voice signals, for input of the sound feature value series and attribution code, a converter that converts to the sound feature value series of the voice signal of the attribution represented by the attribution code.

Specifically, the learning unit 32 learn parameters of the converter to minimize the value of the learning criterion shown in the formula (25), the value of the learning criterion being represented using the values listed below. The values include the following four values. A first value is real voice similarity of a sound feature value series converted by the converter for input of any attribution code, the real voice similarity being associated with the any attribution code, the real voice similarity being identified by a voice identifier for identifying, for input of an attribution code, whether a voice is a real voice with an attribution indicated by the attribution code or a synthetic voice. A second value is attribution code similarity of a sound feature value series converted by the converter for input of any attribution code, the attribution code similarity being similarity to the any attribution code identified by an attribution identifier. A third value is an error between a sound feature value series reconverted from the sound feature value series converted by the converter for input of an attribution code different from the attribution code of the conversion-source voice signal, the reconversion being done by the converter for input of the attribution code of the conversion-source voice signal, and the sound feature value series of the conversion-source voice signal. A fourth values is a distance between the sound feature value series converted by the converter for input of the attribution code of the conversion-source voice signal and the sound feature value series of the conversion-source voice signal.

The learning unit 32 learn parameters of the voice identifier to minimize the value of the learning criterion shown in the formula (26), the value of the learning criterion being represented using the values described below. Here, the values include real voice similarity of a sound feature value series converted by the converter for input of any attribution code, the real voice similarity being associated with the any attribution code, the real voice similarity being identified by a voice identifier for identifying, for input of an attribution code, whether a voice is a real voice of the attribution represented by the attribution code or a synthetic voice, and real voice similarity of a sound feature value series of the conversion-source voice signal, the real voice similarity being indicated by an attribution code identified by a voice identifier for input of an attribution code of the conversion-source voice signal.

The learning unit 32 learn parameters of the attribution identifier to minimize the value of the learning criterion shown in the formula (27), the value of the learning criterion being represented using the attribution code similarity of the sound feature value series of the conversion-source voice signal, the attribution code similarity being of the conversion-source voice signal identified by the attribution identifier.

The learning unit 32 outputs a voice of the desired attribution to the output unit 50.

Here, each of the converter, the voice identifier, and the attribution identifier is configured using the convolutional network or recurrent network.

Note that the attribution identifier may include the voice identifier and be configured to output each class similarity of each attribution category included in the attribution code and the real voice similarity.

<Configuration of Voice Conversion Device According to an Embodiment of the Present Invention>

Figure 4:
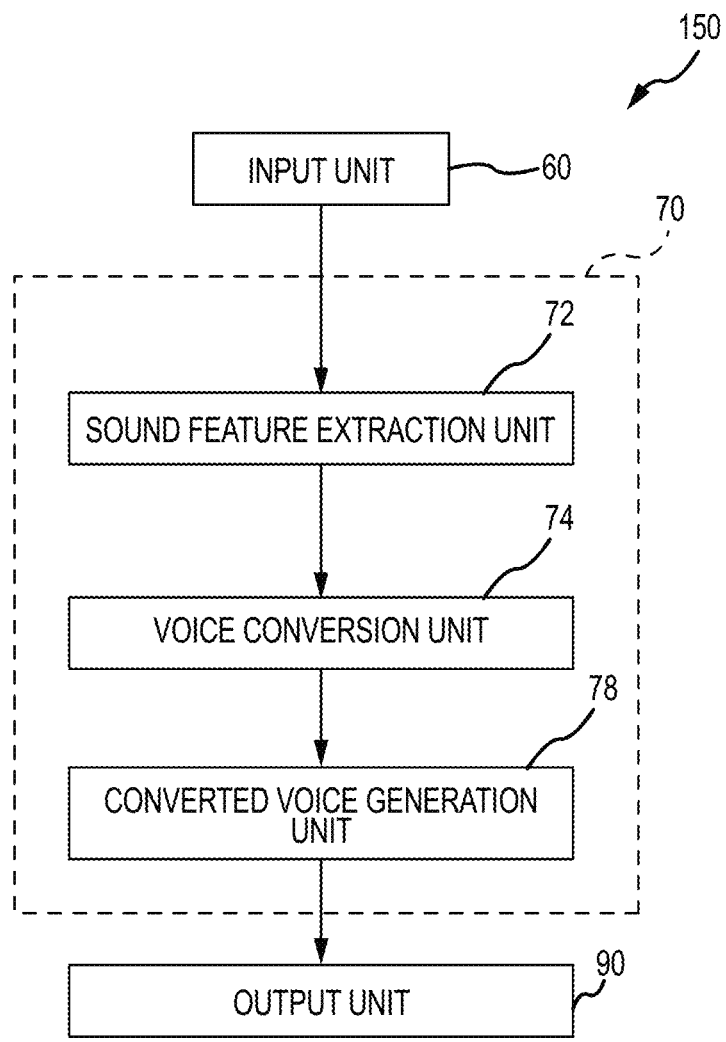
FIG. 4 is a block diagram of a configuration of a voice conversion device according to an embodiment of the present invention.

A description will now be given of a configuration of a voice conversion device according to an embodiment of the present invention. As shown in FIG. 4, a voice conversion device 150 according to the embodiment of the present invention may be configured by a computer including a CPU, a RAM, and a ROM that stores a program and various data for performing a voice conversion process routine described below. The voice conversion device 150 includes, from a functional point of view, an output unit 90, an operation unit 70, and an input unit 60, as shown in FIG. 2.

The input unit 60 receives, as input, the conversion-source voice signal and the attribution code indicating the attribution of the target voice signal. Note that the attribution code indicating the attribution of the target voice signal may be manually provided.

The operation unit 70 is configured by including a sound feature extraction unit 72, a voice conversion unit 74, and a converted voice generation unit 78.

The sound feature extraction unit 72 extracts the sound feature value series from the input conversion-source voice signal.

The voice conversion unit 74 uses a converter learned by the voice conversion learning device 100 to estimate the sound feature value series of the target voice signal from the sound feature value series extracted by the sound feature extraction unit 72 and the attribution code received by the input unit 60.

The converted voice generation unit 78 generates a time domain signal from the estimated sound feature value series of the target voice signal and outputs it to the output unit 90 as a target voice signal.

<Operation of Voice Conversion Learning Device According to Embodiment of the Present Invention>

Figure 5:
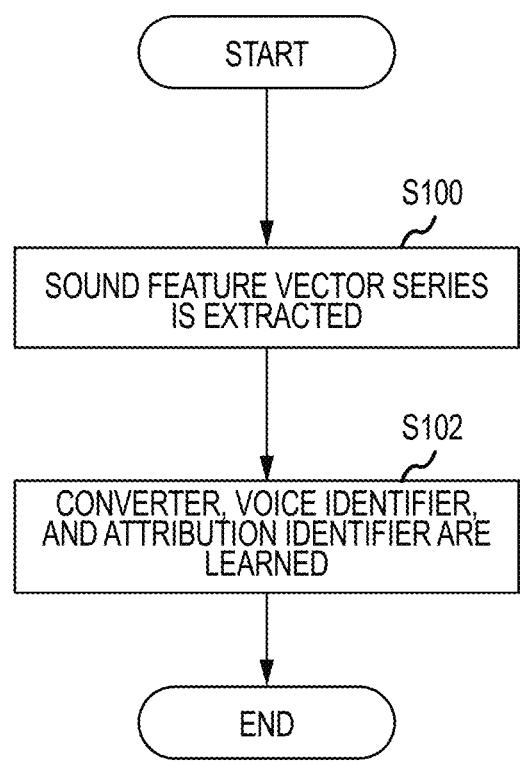
FIG. 5 is a flowchart of a voice conversion learning processing routine of a voice conversion learning device according to an embodiment of the present invention.

An operation of the voice conversion learning device 100 according to an embodiment of the present invention will now be described. When the input unit 10 receives each of the conversion-source voice signals with different attributions and the attribution code representing each attribution of the conversion-source voice signals, the voice conversion learning device 100 performs the voice conversion learning processing routine shown in FIG. 5.

First, at step S100, the sound feature value series is extracted from each of the input conversion-source voice signal.

Next, at step S102, on the basis of the sound feature value series in each of the conversion-source voice signals and the attribution code representing each attribution of the conversion-source voice signals, the converter, voice identifier, and attribution identifier are learned, the learning result is output to the output unit 50, and then the voice conversion learning processing routine is ended.

<Operation of Voice Conversion Device According to Embodiment of the Present Invention>

Figure 6:
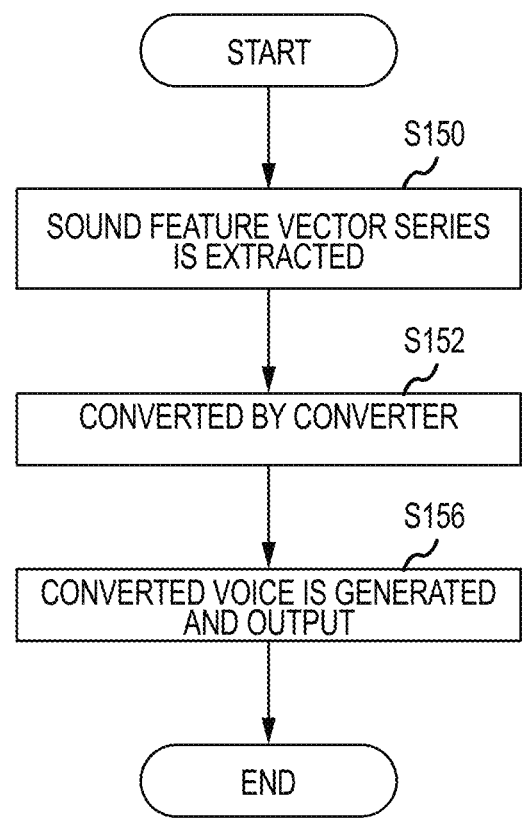
FIG. 6 is a flowchart showing a voice conversion process routine in a voice conversion device according to an embodiment of the present invention.

An operation of the voice conversion device 150 according to an embodiment of the present invention will now be described. The input unit 60 receives the learning result by the voice conversion learning device 100. In addition, when the input unit 60 receives the conversion-source voice signal and the attribution code indicating the attribution of the target voice signal, the voice conversion device 150 performs the voice conversion processing routine shown in FIG. 6.

First, at step S150, the sound feature value series is extracted from the input conversion-source voice signal.

Next, at step S152, a converter learned by the voice conversion learning device 100 is used to estimate the sound feature value series of the target voice signal from the sound feature value series extracted by the sound feature extraction unit 72 and the attribution code received by the input unit 60.

At step S156, the time domain signal is generated from the estimated sound feature amount series of the target voice signal and is output by the output unit 90 as the target voice signal. The voice conversion process routine is then ended.

<Experimental Results>

To confirm the converted voice quality and the conversion effect according to the technique in the embodiment of the present invention, audio data of 4 speakers in Voice Conversion Challenge (VCC) 2018 (a female speaker VCC2SF1, a male speaker VCC2SM1, a female speaker VCC2SF2, and a male speaker VCC2SM2) were used to do a speaker individuality conversion experiment. Here, the attribution code was a 4 dimensional one-hot vector corresponding to the speaker ID. Each speaker has learning data of 81 sentences and test data of 35 sentences. The entire voice signal has a sampling frequency of 22050 Hz. From each utterance, the WORLD analysis extracts the spectrum envelope, basic frequency ($F_0$), and non-periodicity index. The extracted spectrum envelope series is then subjected to 35th order mel-cepstral analysis. For $F_0$, the average $m_{src}$ and standard deviation $\sigma_{src}$ of log F0 in the voiced section is calculated from the learning data of the conversion-target voice and the average $m_{trg}$ and standard deviation $\sigma_{src}$ of log $F_0$ in the voiced section is calculated from the learning data of the conversion-source voice. Then the log $F_0$ pattern $y(0), \ldots, y(N-1)$ of the input voice is converted as follows.

[Formula 17]

$$\hat{y}(n) = \frac{\sigma_{trg}}{\sigma_{src}}(y(n) - m_{src}) + m_{trg} \quad (28)$$

The experiment used the learning method I with the network configuration of the G, D, and C as shown in table 1. In each table, the first column shows the type of each layer, the second column shows the number of channels and size of input to each layer, the third column shows the number of channels and size of output from each layer, the fourth column shows the filter size, the fifth column shows the stride of the convolution, and the sixth column shows the type of the activation function (GLU abbreviates Gated Linear Unit and BN abbreviates Batch Normization).

TABLE 1

| G (Input: (1 + 4)ch × 36 × 512, Output: 1 ch × 36 × 512) | | | | | |
|---|---|---|---|---|---|
| convolution, | in: 1 ch × 36 × 512, | out: 32 ch × 36 × 512, | 3 × 9, | (1, 1), | GLU & BN |
| convolution, | in: 32 ch × 36 × 512, | out: 64 ch × 18 × 256, | 4 × 8, | (2, 2), | GLU & BN |
| convolution, | in: 64 ch × 18 × 256, | out: 128 ch × 9 × 128, | 4 × 8, | (2, 2), | GLU & BN |
| convolution, | in: 128 ch × 9 × 128, | out: 64 ch × 9 × 128, | 3 × 5, | (1, 1), | GLU & BN |
| convolution, | in: 64 ch × 9 × 128, | out: 5 ch × 1 × 128, | 9 × 5, | (0, 1), | GLU & BN |
| deconvolution, | in: (0 + 4) ch × 1 × 128, | out: 64 ch × 9 × 128, | 9 × 5, | (0, 1), | GLU & BN |
| deconvolution, | in: (64 + 4) ch × 9 × 128, | out: 128 ch × 9 × 128, | 3 × 5, | (1, 1), | GLU & BN |
| deconvolution, | in: (128 + 4) ch × 9 × 128, | out: 64 ch × 18 × 256, | 4 × 8, | (2, 2), | GLU & BN |
| deconvolution, | in: (64 + 4) ch × 18 × 256, | out: 32 ch × 36 × 512, | 4 × 8, | (2, 2), | GLU & BN |
| deconvolution, | in: (32 + 4) ch × 36 × 512, | out: 1 ch × 36 × 512, | 3 × 9, | (1, 1), | None |
| D (Input: (1 + 4)ch × 36 × 512, Output: 1 ch × 4 × 64) | | | | | |
| convolution, | in: (1 + 4) ch × 36 × 512, | out: 32 ch × 36 × 512, | 3 × 9, | (1, 1), | GLU & BN |
| convolution, | in: (32 + 4) ch × 36 × 512, | out: 32 ch × 36 × 256, | 3 × 6, | (1, 2), | GLU & BN |
| convolution, | in: (32 + 4) ch × 36 × 256, | out: 32 ch × 36 × 128, | 3 × 6, | (1, 2), | GLU & BN |
| convolution, | in: (32 + 4) ch × 36 × 128, | out: 32 ch × 36 × 64, | 3 × 6, | (1, 2), | GLU & BN |
| convolution, | in: (32 + 4) ch × 36 × 64, | out: 1 ch × 1 × 64, | 36 × 5, | (36, 1), | Sigmoid |
| C (Input: 1 ch × 8 × 512, Output: 4 ch × 1 × 16) | | | | | |
| convolution, | in: 1 ch × 8 × 512, | out: 8 ch × 4 × 256, | 4 × 4, | (2, 2), | GLU & BN |
| convolution, | in: 8 ch × 4 × 256, | out: 16 ch × 2 × 128, | 4 × 4, | (2, 2), | GLU & BN |
| convolution, | in: 16 ch × 2 × 128, | out: 32 ch × 1 × 64, | 4 × 4, | (2, 2), | GLU & BN |
| convolution, | in: 32 ch × 1 × 64, | out: 16 ch × 1 × 32, | 3 × 4, | (1, 2), | GLU & BN |
| convolution, | in: 16 ch × 1 × 32, | out: 4 ch × 1 × 16, | 1 × 4, | (1, 2), | Softmax |

(+4)ch in the input of each layer means an auxiliary input channel of the attribution code c.

Figure 7:
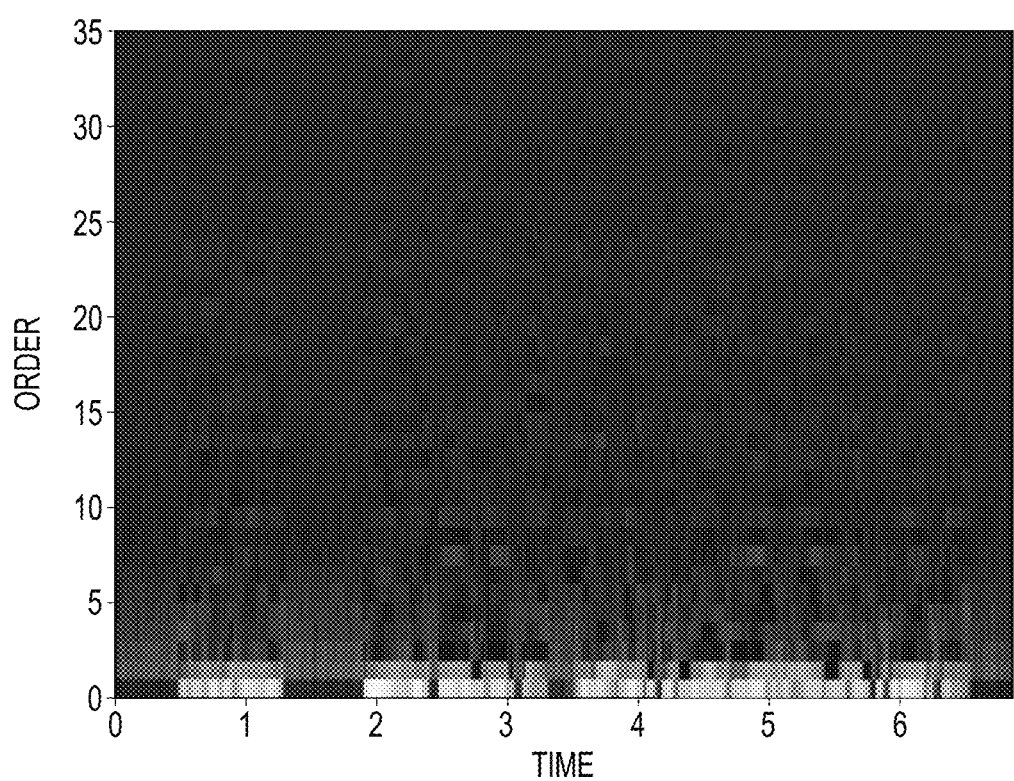
FIG. 7 shows a sound feature value series of a conversion-source voice (test data).
Figure 8:
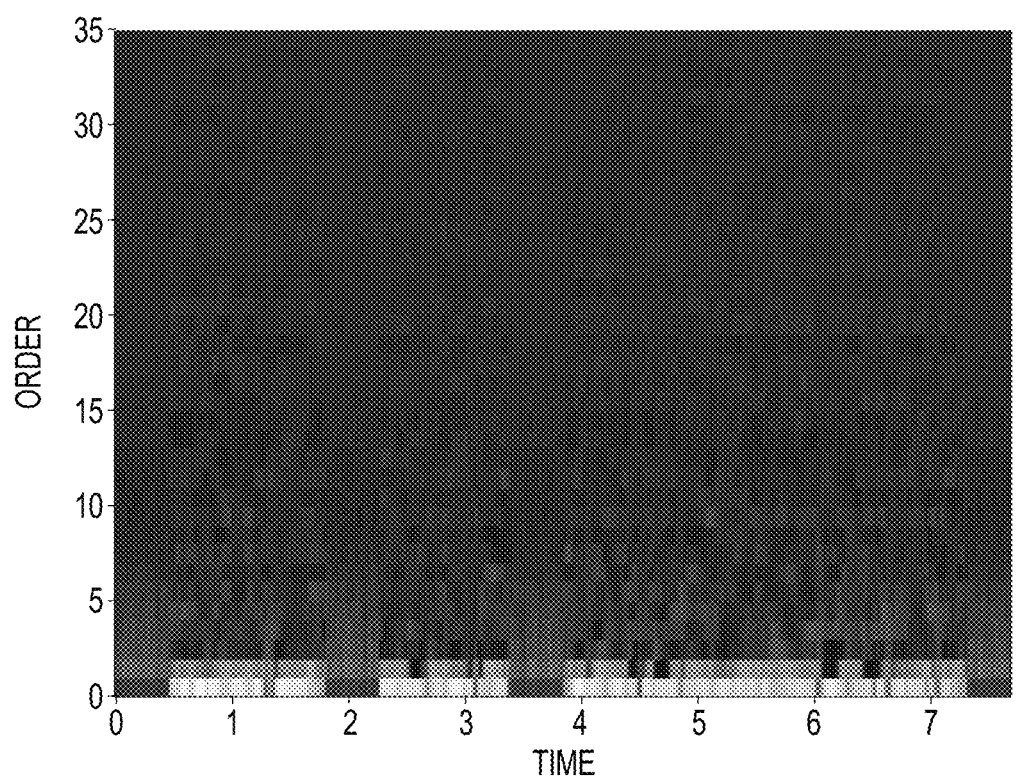
FIG. 8 shows a feature value series of a target voice having the same utterance sentence as the test data.
Figure 9:
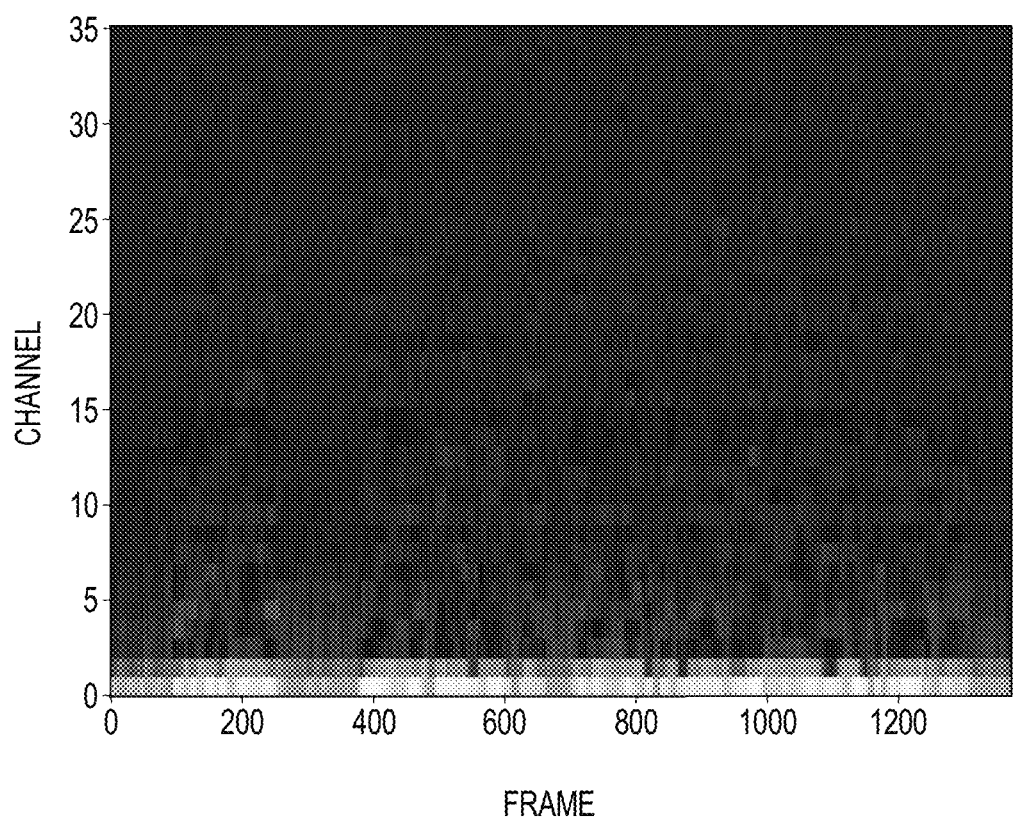
FIG. 9 shows a sound feature value series of a converted voice by a technique according to an embodiment of the present invention.
Figure 10:
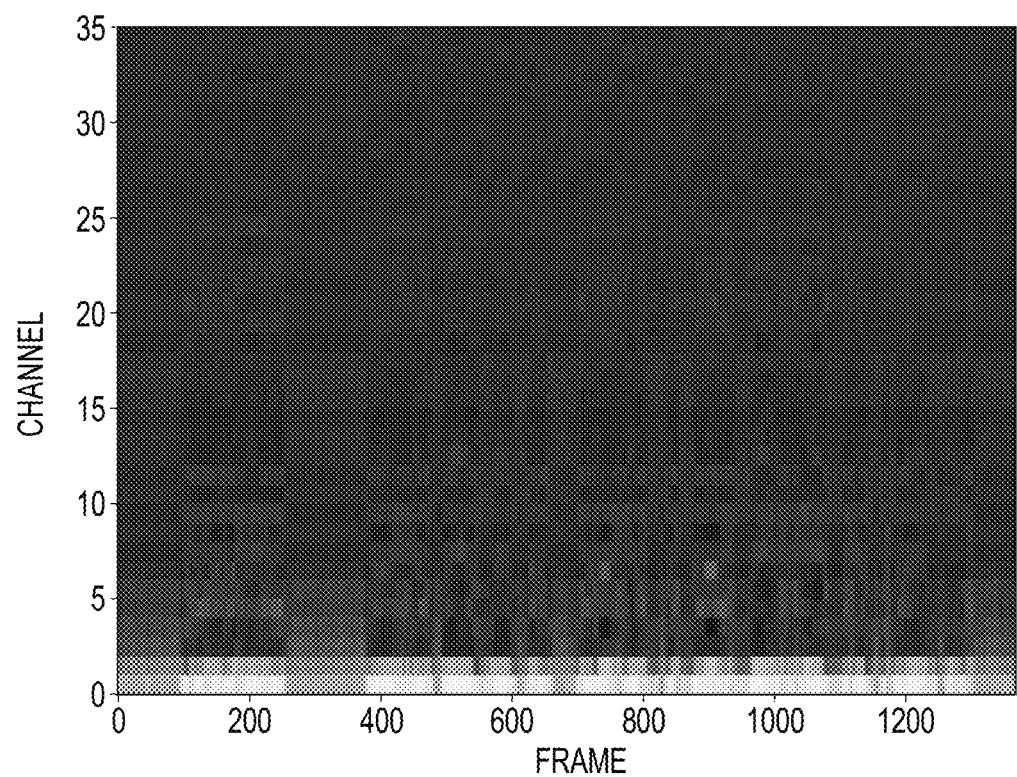
FIG. 10 shows a sound feature value series of the converted voice by a conventional technique.
Figure 11:
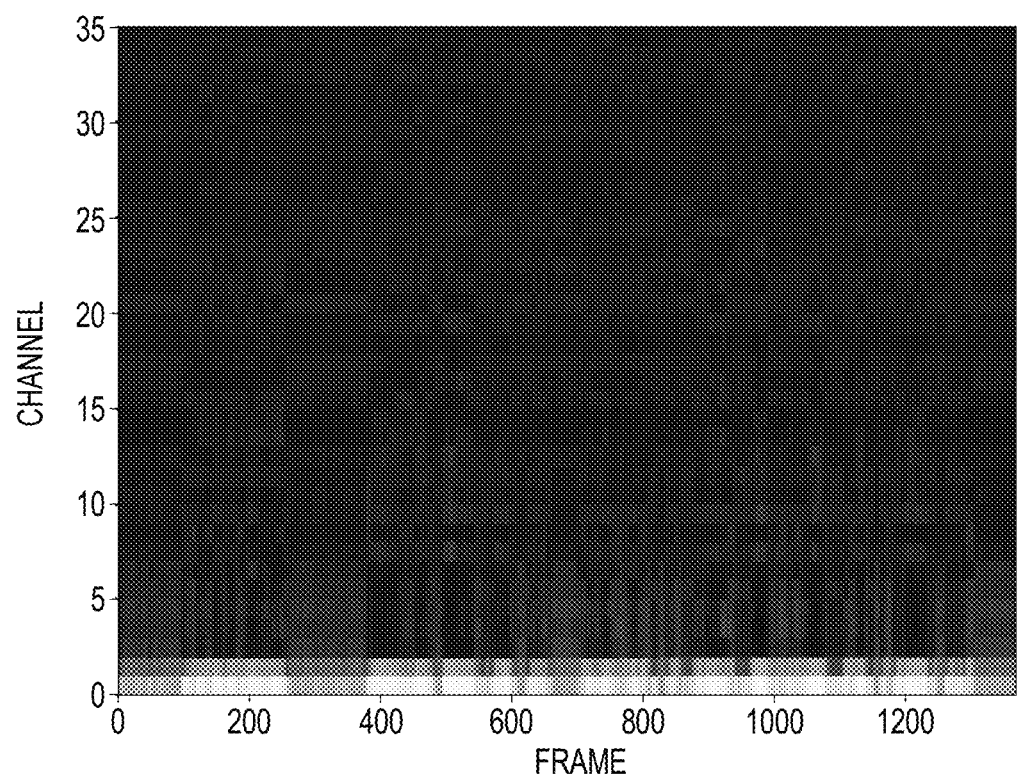
FIG. 11 shows a sound feature value series of the converted voice by another conventional technique.

For test data in FIG. 7, FIG. 9 shows the sound feature value series of the voice converted according to the method in the embodiment of the present invention, FIG. 10 shows the sound feature value series of the voice converted according to the conventional method (CVAE scheme) described in NPL 1, and FIG. 11 shows the sound feature value series of the voice converted according to a modified version of the method described in NPL 2. In addition, FIG. 8 shows the feature value series of the conversion-target voice that has the same utterance sentence as the test data. It was confirmed from FIG. 9 to 11 that the method according to the embodiment of the present invention provided a converted voice of the sound feature value series that was nearer to that in FIG. 8 than the two conventional methods did. In addition, by listening to and comparing the voice signals generated from these sound feature value series, it was confirmed that the method according to the embodiment of the present invention provided a voice with higher quality and more similar to that of the conversion-target speaker than the conventional methods.

As described above, a voice conversion learning device according to an embodiment of the present invention allows to learn parameters of the converter to minimize the value of a learning criterion represented using the values listed below. The values include the following four values. A first value is real voice similarity of a sound feature value series converted by the converter for input of any attribution code, the real voice similarity being associated with the any attribution code, the real voice similarity being identified by a voice identifier. A second value is attribution code similarity of a sound feature value series converted by the converter for input of any attribution code, the attribution code similarity being similarity to the any attribution code identified by an attribution identifier. A third value is an error between a sound feature value series reconverted from the sound feature value series converted by the converter for input of an attribution code different from the attribution code of the conversion-source voice signal, the reconversion being done by the converter for input of the attribution code of the conversion-source voice signal, and the sound feature value series of the conversion-source voice signal. A fourth values is a distance between the sound feature value series converted by the converter for input of the attribution code of the conversion-source voice signal and the sound feature value series of the conversion-source voice signal.

A voice conversion learning device according to an embodiment of the present invention learns parameters of the voice identifier to minimize a value of a learning criterion represented using the values described below. Here, the values include real voice similarity of a sound feature value series converted by the converter for input of any attribution code, the real voice similarity being associated with the any attribution code, the real voice similarity being identified by a voice identifier, and real voice similarity of a sound feature value series of the conversion-source voice signal, the real voice similarity being indicated by an attribution code identified by a voice identifier for input of an attribution code of the conversion-source voice signal.

A voice conversion learning device according to an embodiment of the present invention learns parameters of the attribution identifier to minimize a value of a learning criterion represented using the attribution code similarity of the sound feature value series of the conversion-source voice signal, the attribution code similarity being of the conversion-source voice signal identified by the attribution identifier.

As described above, a voice conversion learning device according to an embodiment of the present invention may learn a converter that may convert to a voice of the desired attribution by learning parameters of a converter, a voice identifier, and an attribution identifier.

In addition, a voice conversion device according to an embodiment of the present invention learn parameters of the converter to minimize the value of a learning criterion represented using the values listed below. The values include the following four values. A first value is real voice similarity of a sound feature value series converted by the converter for input of any attribution code, the real voice similarity being associated with the any attribution code, the real voice similarity being identified by a voice identifier. A second value is attribution code similarity of a sound feature value series converted by the converter for input of any attribution code, the attribution code similarity being similarity to the any attribution code identified by an attribution identifier. A third value is an error between a sound feature value series reconverted from the sound feature value series converted by the converter for input of an attribution code different from the attribution code of the conversion-source voice signal, the reconversion being done by the converter for input of the attribution code of the conversion-source voice signal, and the sound feature value series of the conversion-source voice signal. A fourth values is a distance between the sound feature value series converted by the converter for input of the attribution code of the conversion-source voice signal and the sound feature value series of the conversion-source voice signal.

A voice conversion device according to an embodiment of the present invention allows to learn parameters of the voice identifier to minimize a value of a learning criterion represented using the values described below.

Here, the values include real voice similarity of a sound feature value series converted by the converter for input of any attribution code, the real voice similarity being associated with the any attribution code, the real voice similarity being identified by a voice identifier, and real voice similarity of a sound feature value series of the conversion-source voice signal, the real voice similarity being indicated by an attribution code identified by a voice identifier for input of an attribution code of the conversion-source voice signal.

A voice conversion device according to an embodiment of the present invention allows to learn parameters of the attribution identifier to minimize a value of a learning criterion represented using the attribution code similarity of the sound feature value series of the conversion-source voice signal, the attribution code similarity being of the conversion-source voice signal identified by the attribution identifier.

As described above, a voice conversion device according to an embodiment of the present invention may convert to a voice of the desired attribution by estimating a sound feature value series of a target voice signal from a sound feature value series in an input conversion-source voice signal and an attribution code indicating an attribution of the target voice signal, using a converter obtained by learning parameters of the converter, the voice identifier, and the attribution identifier.

Note that the present invention is not limited to the above embodiments and various modifications and application may be made without departing from the spirit of the present invention.

For example, although in the above embodiments, the voice conversion learning device and voice conversion device are configured as distinct devices, they may be configured as one device.

In addition, while the above voice conversion learning device and voice conversion device include a computer device therein, the "computer device" is defined to include a website providing environment (or a display environment) as long as it uses the WWW device.

In addition, although the specification of the present application describes embodiments in which a program is previously installed, the relevant program may be provided after being stored in a computer-readable storage medium.

REFERENCE SIGNS LIST

10 Input unit
20 Operation unit
30 Sound feature extraction unit
32 Learning unit
50 Output unit
60 Input unit
70 Operation unit
72 Sound feature extraction unit
74 Voice conversion unit
78 Converted voice generation unit
90 Output unit
100 Voice conversion learning device
150 Voice conversion device

The invention claimed is:

1. A voice conversion learning device comprising:
a learner configured to learn, on the basis of a sound feature value series for each of conversion-source voice signals with different attributions, and attribution codes indicating each attribution of the conversion-source voice signals, a converter configured to convert, for input of a sound feature value series and an attribution code, to a sound feature value series of a voice signal of an attribution indicated by the attribution code,
the learner learning the converter to minimize a value of a learning criterion represented using:
real voice similarity of a sound feature value series converted by the converter for input of any attribution code, the real voice similarity being associated with the any attribution code, the real voice similarity being identified a voice identifier for identifying, for input of an attribution code, whether a voice is a real voice with an attribution indicated by the attribution code or a synthetic voice,
attribution code similarity of a sound feature value series converted by the converter for input of any attribution code, the attribution code similarity being similarity to the any attribution code identified by an attribution identifier,
an error between a sound feature value series reconverted from the sound feature value series converted by the converter for input of an attribution code different from the attribution code of the conversion-source voice signal, the reconversion being done by the converter for input of the attribution code of the conversion-source voice signal, and the sound feature value series of the conversion-source voice signal, and
a distance between the sound feature value series converted by the converter for input of the attribution code of the conversion-source voice signal and the sound feature value series of the conversion-source voice signal, the learner learning the voice identifier to minimize a value of a learning criterion represented using:
real voice similarity of a sound feature value series converted by the converter for input of any attribution code, the real voice similarity being associated with the any attribution code, the real voice similarity being identified by the voice identifier for identifying, for input of an attribution code, whether a voice is a real voice with an attribution indicated by the attribution code or a synthetic voice, and real voice similarity indicated by the attribution code of the sound feature value series of the conversion-source voice signal, the real voice similarity being identified by the voice identifier for input of the attribution code of the conversion-source voice signal, and the learner learning the attribution identifier to minimize a value of a learning criterion represented using attribution code similarity of the sound feature value series of the conversion-source voice signal, the attribution code similarity being of the conversion-source voice signal identified by the attribution identifier.

2. The voice conversion learning device according to claim 1, wherein each of the converter, the voice identifier, and the attribution identifier is configured using a convolutional network or a recurrent network.

3. The voice conversion learning device according to claim 1, wherein the attribution identifier comprises the voice identifier, and the attribution identifier outputs each class similarity of each attribution category included in the attribution code and the real voice similarity.

4. The voice conversion learning device according to claim 1, wherein the attribution indicated by the attribution code includes at least one of:
gender,
adult,
children,
speaker identifier,
whether a native speaker or not,
a mood of a speaker, and
a mode of utterance including a lecture-like utterance.

5. The voice conversion learning device according to claim 1, wherein the learning criterion is associated with at least one of:
an adversarial learning criterion,
an cycle-consistent criterion,
a construction error criterion, and
an attribution identification criterion.

6. The voice conversion learning device according to claim 1, wherein the attribution code is an auxiliary input along with the sound feature value series as an input to a network used by each of the converter, the voice identifier, and the attribution identifier.

7. The voice conversion learning device according to claim 2, wherein the attribution identifier comprises the voice identifier, and the attribution identifier outputs each class similarity of each attribution category included in the attribution code and the real voice similarity.

8. A voice conversion device comprising:
a voice converter, the voice converter estimating a sound feature value series of a target voice signal from a sound feature value series in an input conversion-source voice signal and an attribution code indicating an attribution of the target voice signal, using a converter for converting, for input of a sound feature value series and an attribution code, to a sound feature value series of a voice signal of an attribution indicated by the attribution code, the converter being previously learned to minimize, on the basis of a sound feature value series for each of conversion-source voice signals with different attributions, and attribution codes indicating each attribution of the conversion-source voice signals, value of a learning criterion represented using:

real voice similarity of a sound feature value series converted by the converter for input of any attribution code, the real voice similarity being associated with the any attribution code, the real voice similarity being identified a voice identifier for identifying, for input of an attribution code, whether a voice is a real voice with an attribution indicated by the attribution code or a synthetic voice, attribution code similarity of a sound feature value series converted by the converter for input of any attribution code, the attribution code similarity being similarity to the any attribution code identified by an attribution identifier; an error between a sound feature value series reconverted from the sound feature value series converted by the converter for input of an attribution code different from the attribution code of the conversion-source voice signal, the reconversion being done by the converter for input of the attribution code of the conversion-source voice signal, and the sound feature value series of the conversion-source voice signal, and a distance between the sound feature value series converted by the converter for input of the attribution code of the conversion-source voice signal and the sound feature value series of the conversion-source voice signal, the voice identifier being previously learned to minimize a value of a learning criterion represented using:

real voice similarity of a sound feature value series converted by the converter for input of any attribution code, the real voice similarity being associated with the any attribution code, the real voice similarity being identified by the voice identifier for identifying, for input of an attribution code, whether a voice is a real voice with an attribution indicated by the attribution code or a synthetic voice, and real voice similarity indicated by the attribution code of the sound feature value series of the conversion-source voice signal, the real voice similarity being identified by the voice identifier for input of the attribution code of the conversion-source voice signal, and the attribution identifier being previously learned to minimize a value of a learning criterion represented using attribution code similarity of the sound feature value series of the conversion-source voice signal, the attribution code similarity being of the conversion-source voice signal identified by the attribution identifier.

9. The voice conversion device according to claim 8, wherein the attribution indicated by the attribution code includes at least one of:
gender,
adult,
children,
speaker identifier,
whether a native speaker or not,
a mood of a speaker, and
a mode of utterance including a lecture-like utterance.

10. The voice conversion device according to claim 8, wherein the learning criterion is associated with at least one of:
  an adversarial learning criterion,
  an cycle-consistent criterion,
  a construction error criterion, and
  an attribution identification criterion.

11. The voice conversion device according to claim 8, wherein the attribution code is an auxiliary input along with the sound feature value series as an input to a network used by each of the converter, the voice identifier, and the attribution identifier.

12. The voice conversion device according to claim 8, wherein each of the converter, the voice identifier, and the attribution identifier is configured using a convolutional network or a recurrent network.

13. The voice conversion device according to claim 8, wherein the attribution identifier comprises the voice identifier, and the attribution identifier outputs each class similarity of each attribution category included in the attribution code and the real voice similarity.

14. The voice conversion device according to claim 12, wherein the attribution identifier comprises the voice identifier, and the attribution identifier outputs each class similarity of each attribution category included in the attribution code and the real voice similarity.

15. A voice conversion learning method comprising:
  learning, by a learner, on the basis of a sound feature value series for each of conversion-source voice signals with different attributions, and attribution codes indicating each attribution of the conversion-source voice signals, a converter configured to convert, for input of a sound feature value series and an attribution code, to a sound feature value series of a voice signal of an attribution indicated by the attribution code, learning the converter to minimize a value of a learning criterion represented using:
    real voice similarity of a sound feature value series converted by the converter for input of any attribution code, the real voice similarity being associated with the any attribution code, the real voice similarity being identified a voice identifier for identifying, for input of an attribution code, whether a voice is a real voice with an attribution indicated by the attribution code or a synthetic voice,
    attribution code similarity of a sound feature value series converted by the converter for input of any attribution code, the attribution code similarity being similarity to the any attribution code identified by an attribution identifier,
    an error between a sound feature value series reconverted from the sound feature value series converted by the converter for input of an attribution code different from the attribution code of the conversion-source voice signal, the reconversion being done by the converter for input of the attribution code of the conversion-source voice signal, and
    the sound feature value series of the conversion-source voice signal, and
    a distance between the sound feature value series converted by the converter for input of the attribution code of the conversion-source voice signal and the sound feature value series of the conversion-source voice signal;
  learning the voice identifier to minimize a value of a learning criterion represented using:
    real voice similarity of a sound feature value series converted by the converter for input of any attribution code, the real voice similarity being associated with the any attribution code, the real voice similarity being identified by the voice identifier for identifying, for input of an attribution code, whether a voice is a real voice with an attribution indicated by the attribution code or a synthetic voice, and
    real voice similarity indicated by the attribution code of the sound feature value series of the conversion-source voice signal, the real voice similarity being identified by the voice identifier for input of the attribution code of the conversion-source voice signal;
  learning the attribution identifier to minimize a value of a learning criterion represented using attribution code similarity of the sound feature value series of the conversion-source voice signal, the attribution code similarity being of the conversion-source voice signal identified by the attribution identifier; and
  estimating, by a voice converter, a sound feature value series of a target voice signal from a sound feature value series in an input conversion-source voice signal and the attribution code indicating an attribution of the target voice signal, using the converter for converting, for input of the sound feature value series and the attribution code, to the sound feature value series of the voice signal of an attribution indicated by the attribution code, the converter being previously learned to minimize, on the basis of the sound feature value series for each of conversion-source voice signals with different attributions, and attribution codes indicating each attribution of the conversion-source voice signals, value of the learning criterion represented using:
    real voice similarity of the sound feature value series converted by the converter for input of any attribution code, the real voice similarity being associated with the any attribution code, the real voice similarity being identified the voice identifier for identifying, for input of an attribution code, whether the voice is the real voice with an attribution indicated by the attribution code or the synthetic voice,
    attribution code similarity of the sound feature value series converted by the converter for input of any attribution code, the attribution code similarity being similarity to the any attribution code identified by an attribution identifier,
    an error between a sound feature value series reconverted from the sound feature value series converted by the converter for input of the attribution code different from the attribution code of the conversion-source voice signal, the reconversion being done by the converter for input of the attribution code of the conversion-source voice signal, and the sound feature value series of the conversion-source voice signal, and
    a distance between the sound feature value series converted by the converter for input of the attribution code of the conversion-source voice signal and the sound feature value series of the conversion-source voice signal,
  the voice identifier being previously learned to minimize the value of a learning criterion represented using:
    real voice similarity of the sound feature value series converted by the converter for input of any attribution code, the real voice similarity being associated with the any attribution code, the real voice similarity being identified by the voice identifier for identifying, for input of the attribution code, whether the voice is the real voice with an attribution indicated by the attribution code or the synthetic voice, and real voice similarity indicated by the attribution code of the sound feature value series of the conversion-source voice signal, the real voice similarity being identified by the voice identifier for input of the attribution code of the conversion-source voice signal, and the attribution identifier being previously learned to minimize value of the learning criterion represented using attribution code similarity of the sound feature value series of the conversion-source voice signal, the attribution code similarity being of the conversion-source voice signal identified by the attribution identifier.

16. The voice conversion learning method according to claim 15, wherein each of the converter, the voice identifier, and the attribution identifier is configured using a convolutional network or a recurrent network.

17. The voice conversion learning method according to claim 15, wherein the attribution identifier comprises the voice identifier, and the attribution identifier outputs each class similarity of each attribution category included in the attribution code and the real voice similarity.

18. The voice conversion learning method according to claim 15, wherein the attribution indicated by the attribution code includes at least one of:
gender,
adult,
children,
speaker identifier,
whether a native speaker or not,
a mood of a speaker, and
a mode of utterance including a lecture-like utterance.

19. The voice conversion learning method according to claim 15, wherein the learning criterion is associated with at least one of:
an adversarial learning criterion,
an cycle-consistent criterion,
a construction error criterion, and
an attribution identification criterion, and
wherein the attribution code is an auxiliary input along with the sound feature value series as an input to a network used by each of the converter, the voice identifier, and the attribution identifier.

20. The voice conversion learning method according to claim 16, wherein the attribution identifier comprises the voice identifier, and the attribution identifier outputs each class similarity of each attribution category included in the attribution code and the real voice similarity.

* * * * *